United States Patent [19]
Masuda

[11] Patent Number: 5,303,046
[45] Date of Patent: Apr. 12, 1994

[54] VIDEO SIGNAL PROCESSING APPARATUS WITH TIME BASE CORRECTION AND INHIBITION OF HORIZONTAL SYNC SIGNAL REPLACEMENT DURING VERTICAL FLYBACK

[75] Inventor: Isao Masuda, Tokyo, Japan

[73] Assignee: Sony Corporation, Tokyo, Japan

[21] Appl. No.: 967,041

[22] Filed: Oct. 27, 1992

[30] Foreign Application Priority Data

Nov. 1, 1991 [JP] Japan .................. 3-313502

[51] Int. Cl.⁵ .................. H04N 5/06; H04N 5/95
[52] U.S. Cl. .................. 348/500; 358/320; 360/36.2; 360/37.1; 348/521
[58] Field of Search .......... 358/150, 149, 153, 148, 358/320; 360/36.1, 37.1, 36.2; H04N 5/06, 5/95

[56] References Cited

U.S. PATENT DOCUMENTS

| | | | |
|---|---|---|---|
| 4,165,524 | 8/1979 | Ninomiya | 358/326 |
| 4,251,830 | 2/1981 | Tatami | 358/320 |
| 4,737,861 | 4/1988 | Sekimoto | 358/320 |

FOREIGN PATENT DOCUMENTS

| | | | |
|---|---|---|---|
| 261075 | 12/1985 | Japan | 360/36.1 |
| 106683 | 4/1989 | Japan | H04N 5/94 |
| 177179 | 8/1991 | Japan | H04N 5/95 |
| 4139980 | 5/1992 | Japan | H04N 5/95 |

*Primary Examiner*—James J. Groody
*Assistant Examiner*—Chris Grant
*Attorney, Agent, or Firm*—William S. Frommer; Alvin Sinderbrand

[57] ABSTRACT

In a video signal processing apparatus for correcting time axis errors using a memory, with replacement of a horizontal sync signal in a video signal read out from the memory by a reference horizontal sync signal, data appearing in a vertical flyback period is not lost. A vertical flyback period detecting circuit functioning as an inhibiting means detects the vertical flyback period and produces a detection signal. An AND gate gates the detection signal and a reference horizontal sync signal generated from a sync signal generating circuit, so that a replacement of the horizontal sync signal is inhibited during the vertical flyback period, and an address, a time code and an ID code which have been inserted during the vertical flyback period are not lost.

4 Claims, 3 Drawing Sheets

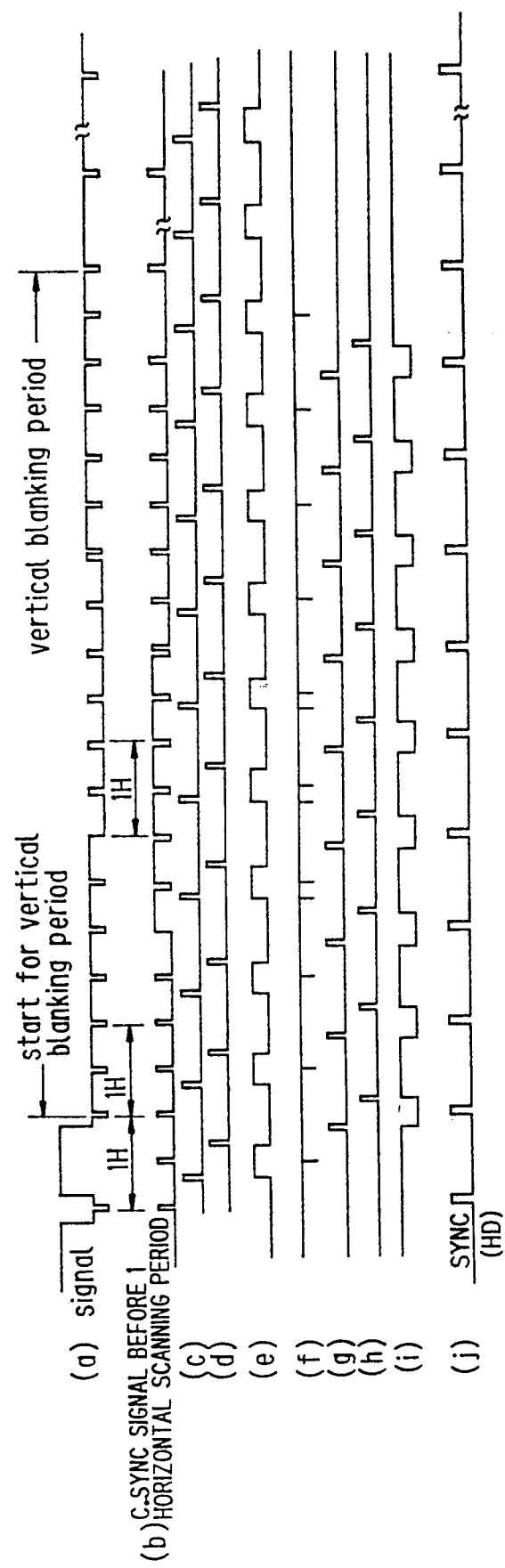

VIDEO SIGNAL PROCESSING APPARATUS WITH TIME BASE CORRECTION AND INHIBITION OF HORIZONTAL SYNC SIGNAL REPLACEMENT DURING VERTICAL FLYBACK

BACKGROUND OF THE INVENTION

1. Field of the Invention

The present invention relates to a video signal processing apparatus used in a video tape recorder (VTR), a video disk player (VDP) and the like, for digitally processing a video signal using a memory.

2. Description of the Prior Art

Conventionally, VTRs and the like employ a video memory as a time axis correcting apparatus and a frame synchronizer.

FIG. 1 is a schematic block diagram of a conventional VTR apparatus. In this drawing, after a video signal has been A/D-converted by an A/D (analog-to-digital) converter 1 into a corresponding digital video signal, the digital video signal is written into a memory 2. Then, the digital video signal which has been written into the memory 2 is read out and D/A-converted into a corresponding analog video signal by a D/A (digital-to-analog) converter 3. The output derived from the D/A converter 3 is supplied to a replacing circuit 4. The function of the replacing circuit 4 is to replace a synchronizing (sync) signal (vertical synchronizing signal and horizontal synchronizing signal) of the video signal corresponding to the output from the D/A converter 3, with a reference sync signal generated from a sync-signal generating circuit 7. This implies such a sync-insert circuit in which, in order to reduce the memory capacity of the memory 2, no sync signal portion is written into the memory, but only the video period is written therein.

In any cases the video signal to which the reference sync signal has been added by the replacing circuit 4, corresponds to an output signal with a stable time axis.

It should be noted that a PLL (phase-locked loop) 5 produces a write clock whose phase is synchronized with the phase of the input video signal, and also an oscillator 6 produces a reference read clock.

In the above-described conventional apparatus, since the digital video signal is read out from the memory 2 in response to a stable reference clock, and furthermore the sync signal is replaced with a stable reference sync signal, time axis correction is carried out.

On the other hand, there are several sorts of reference sync signals to be generated by the sync-signal generating circuit 7, such as the horizontal sync signal, the vertical sync signal and the equalizing pulse. As a result, a large quantity of frequency dividing circuits are required which properly divide an oscillator output having a frequency of, for instance, $Nf_{sc}$ (symbol "N" denotes any integer, and symbol "$f_{sc}$" represents a color sub-carrier frequency) provided by a crystal oscillator. Therefore, a total number of elements in the conventional apparatus is large.

Further, in a video signal recorded by a recently developed VTR, a time code, an address, an ID code and the like, which are referred to as a "VITC", have been recorded during a vertical flyback (retrace) period of this video signal. Also in a VDP, an address, a picture stop code and the like have been recorded. As a consequence, if the synchronizing signals of the vertical flyback period are replaced by the reference synchronizing signal in the conventional apparatus, these data will be lost. When the video signal from which these data have been lost is dubbed in another VTR, the lost data are not dubbed.

SUMMARY OF THE INVENTION

The present invention has been made in an attempt to solve these problems of the prior art, and has as its object to provide a video signal processing apparatus in which data existing in a vertical flyback period is not lost.

To achieve this object, a video signal processing apparatus according to the present invention includes:

a sync-signal generating circuit 7 functioning as a sync-signal generating means for generating a reference horizontal sync signal;

a replacing circuit 4 functioning as a replacing means for replacing a horizontal sync signal contained in a video signal by the reference horizontal sync signal; and a vertical flyback period detecting circuit 9 and an AND gate 10, functioning as a control means for prohibiting operation of the replacing circuit 4 during the vertical flyback period of the video signal.

In accordance with the video signal processing apparatus with the above-described arrangement, the vertical flyback period of the video signal is detected by the control circuit 9, and then the replacing operation of the replacing circuit 4 for the sync signal is prohibited during this vertical flyback period. As a result, the sync signal contained in the input video signal is directly outputted during the vertical flyback period, and the data which has been inserted into the video signal during the vertical flyback period, is not lost.

BRIEF DESCRIPTION OF THE DRAWINGS

For a better understanding to the present invention, reference is made of the following detailed description in conjunction with the accompanying drawings, in which:

FIG. 4 shows a waveform chart of various signals in the circuits of FIG. 3.

DETAILED DESCRIPTION OF THE PREFERRED EMBODIMENTS

Figure 1:
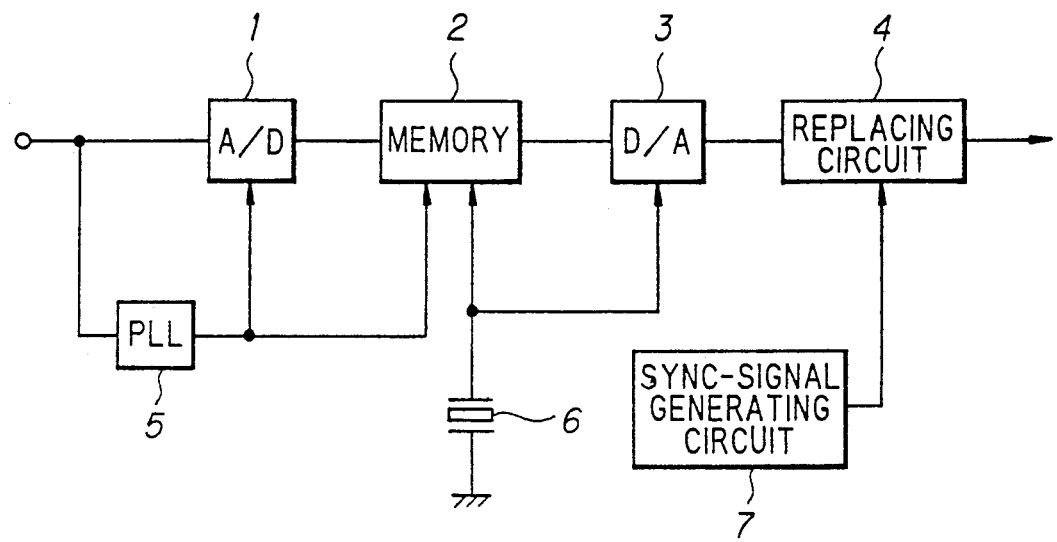
FIG. 1 is a schematic block diagram of the conventional VTR apparatus.

Referring now to the drawings, a video signal processing apparatus according to a preferred embodiment of the present invention will be described. In these drawings, like reference numerals represent identical or similar parts of the conventional video signal processing apparatus, and therefore explanations thereof are omitted.

Figure 2:
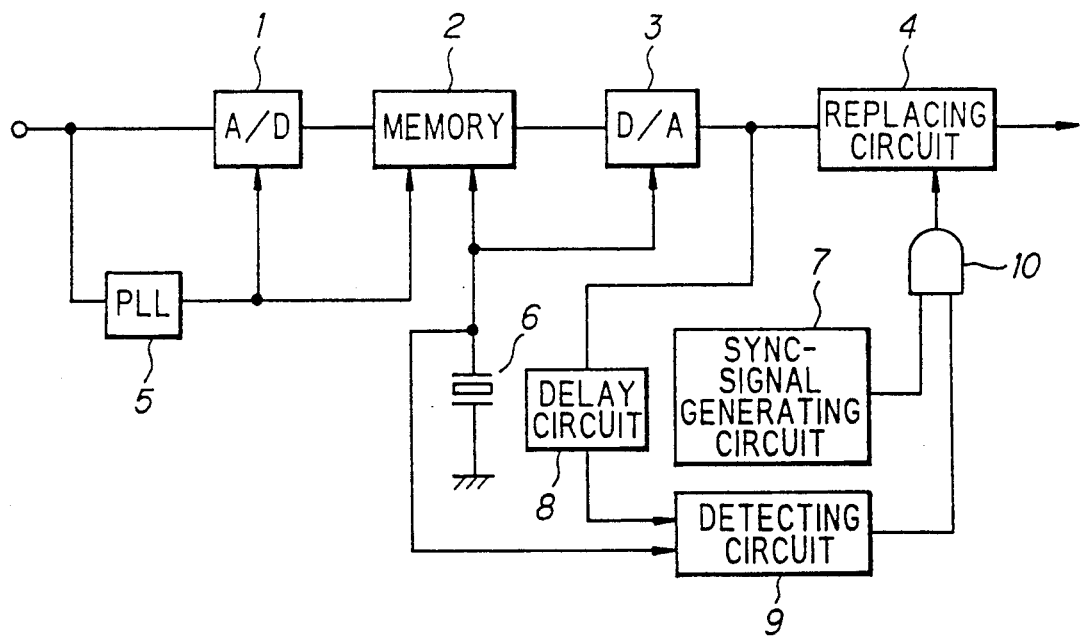
FIG. 2 is a schematic block diagram of a video signal processing apparatus according to a preferred embodiment of the present invention.

In the video signal processing apparatus according to the preferred embodiment, shown in FIG. 2, an output of a D/A converter 3 is supplied not only to a replacing circuit 4, but also a delay circuit 8 for delaying an input signal (see FIG. 4(a) only during one horizontal scanning period. The delay circuit 8 detects a synchronizing (sync) signal contained in the input signal, delays this synchronizing signal by only 1 horizontal scanning period (see FIG. 4(b), and supplies the delayed synchronizing signal to a vertical flyback period detecting circuit (which will be referred to a "detecting circuit") 9 as a controlling means. To the detecting circuit 9, a reference clock signal outputted from a reference clock oscillator 6 is also supplied. The detecting circuit 9 outputs a control signal having a low level within a time period for a generation of a horizontal synchronizing pulse during the vertical flyback period. This control signal and the output from the sync-signal generating circuit 7 are supplied to an AND gate 10. An output from the AND gate 10 is furnished to a replacing circuit 4.

Figure 3:
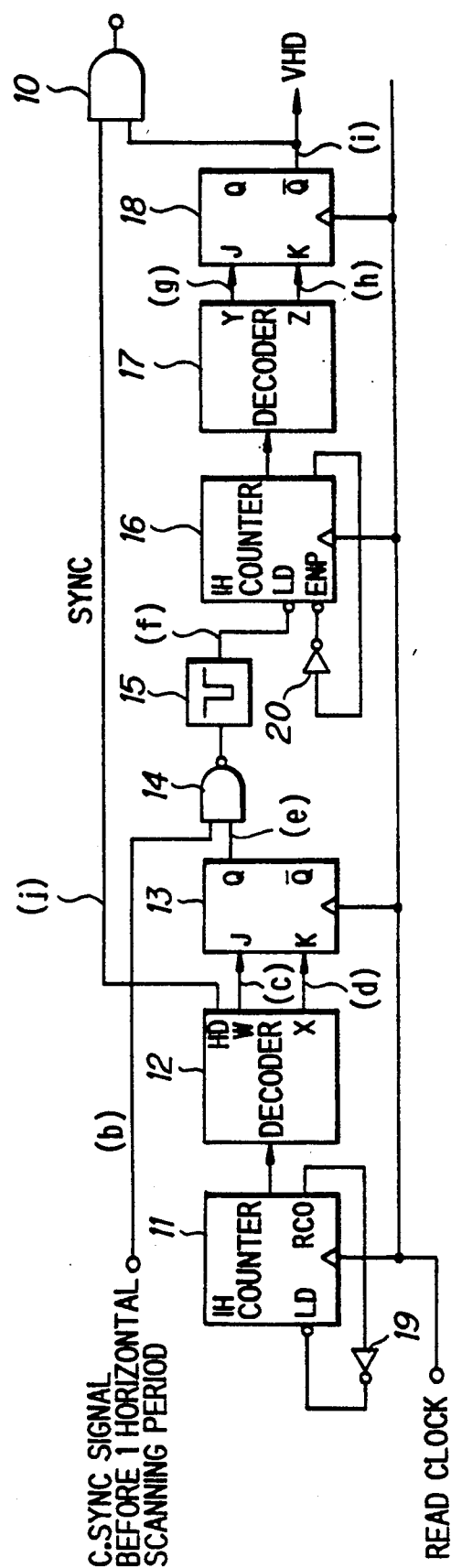
FIG. 3 schematically represents a circuit block diagram of the sync-signal generating circuit 7 and the detecting circuit 9 employed in the video signal processing apparatus shown in FIG. 2.

FIG. 3 is a block diagram for showing details of the sync-signal generating circuit 7 and the detecting circuit 9 represented in FIG. 2. In this drawing, the reference clock signal corresponds to a clock input of a counter 11. It should be noted that the reference clock signal is selected to be, for example, $4 f_{sc}$, and equal to 910 pulses per horizontal scanning period. The counter 11 produces a reset signal when a count value thereof reaches 910, and then resets the count value to zero by supplying this reset signal via an inverter to its LD terminal. The count value of the counter 11 is continuously monitored by a decoder 12. When the count value of the counter 11 reaches a first value "w" and a second value "x", the decoder 12 sends out respective pulses (see FIGS. 4(c) and 4(d) to a J-terminal and a K-terminal of a JK flip-flop 13, respectively, which is connected to the decoder 12. From the decoder 12, a horizontal synchronizing pulse (see FIG. 4(j) is outputted in synchronism with the reset timing of the counter 11 so that this horizontal synchronizing pulse function as a reference horizontal synchronizing signal.

The first value "w" and the second value "x" are set to such values that the generation period for the equalizing pulse in the vertical flyback period falls in the time duration between these values "w" and "x". As a result, a Q-output of the JK flip-flop 13 forms a window signal used for detecting the equalizing pulse. The Q output of the JK flip-flop 13 is inputted to one input of a NAND gate 14, and a composite synchronizing signal (see FIG. 3b) which has been supplied via the delay circuit 8 and inverted by an inverter (not shown) is furnished to the other input of the NAND gate 14. As a consequence, a pulse synchronized with the equalizing pulse is outputted from the NAND gate 14. In other words, no pulse is outputted from the NAND gate 14 in the picture period (which is not the vertical flyback period).

After the waveform of the output signal from the NAND gate 14 has been shaped by a waveform shaping circuit 15, the waveform-shaped output signal is supplied to a reset terminal (load terminal) of a counter 16 (see FIG. 3f). When the count value of the counter 16 reaches 910, a reset signal is produced which is supplied via an inverter 20 to reset counter 16. The count value of the counter 16 is continuously monitored by a decoder 17. When the count values of the counter 16 reach a third value "y" and a fourth value "z", the decoder 17 sends out respective pulses (see FIGS. 3g and 3h) to a J-terminal and a K-terminal of the succeeding JK flip-flop 18.

The third value "y" and the fourth value "z" are set to such values that the generation period of the horizontal synchronizing pulse during the vertical flyback period falls in the time duration between the third and fourth values. As a consequence, a Q-output of a JK flip-flop 18 is at a high level during a time period in which the horizontal synchronizing signal in the vertical flyback period falls, whereas an inverted output (see FIG. 3(i) of this Q-output is at a low level during the time period in which the horizontal synchronizing signal within the vertical flyback period falls.

The inverted output of the JK flip-flop 18 is inputted to one input of an AND gate 10, and the reference horizontal synchronizing signal produced from the decoder 12 is supplied to the other input of the AND gate 10.

In accordance with the above-described circuit arrangement, as a result of the counter 16 which is reset by the equalizing pulse the JK flip-flop 18 for producing the gate signal which gates the time period during which the horizontal synchronizing pulse appears in response to the output from the counter 16, and also the AND gate 10 for AND-gating the inverted output from the JK flip-flop 18 and the reference horizontal synchronizing signal, no reference horizontal synchronizing signal is outputted during the vertical flyback period, but the reference horizontal synchronizing signal is outputted only during the picture period. That is to say, the circuit shown in FIG. 3 constitutes the detecting means for detecting the vertical flyback period and the synchronizing signal generating circuit for the reference synchronizing signal.

As a consequence, when the output from the AND gate 10 is supplied to the replacing circuit 4, the reproduced synchronizing signal is not replaced by the reference synchronizing signal during the vertical flyback period, but the reproduced synchronizing signal is replaced with the reference synchronizing signal only during the picture period.

FIG. 4 represents waveforms of the signals appearing in the various circuit portions in the circuit arrangement of FIG. 3. FIG. 4a shows the waveform of the video signal derived from the D/A converter 3, and FIGS. 4(b) to 4(j) indicate waveforms of signals appearing in the circuit portions denoted by the reference characters (b) to (j), respectively, in FIG. 3.

As previously described in detail, in accordance with the video signal processing apparatus of the present invention, since replacement of the reproduced synchronizing signal by the reference synchronizing signal is inhibited during the vertical flyback period the data contained in the vertical flyback period is no longer lost, and the data can be correctly dubbed even when the data, is dubbed to another recording medium.

Furthermore, since a large number of frequency dividing circuits and the like required to produce the reference synchronizing signal during the vertical flyback period is not needed, the total number of circuit components can be reduced and the cost of the video signal processing apparatus can be lowered.

What is claimed is:

1. An apparatus for processing an input video signal that contains horizontal sync signals and a vertical flyback period, comprising:
    means for generating reference horizontal sync signals;
    means for replacing said horizontal sync signals contained in said input video signal with said reference horizontal sync signals; and
    means for inhibiting operation of said means for replacing during said vertical flyback period contained in said input video signal.

2. An apparatus for processing an input video signal that contains horizontal sync signals and a vertical flyback period, comprising:
- means for generating reference horizontal sync signals;
- means for replacing said horizontal sync signals contained in said input video signal with said reference horizontal sync signals; and
- means for inhibiting operation of said means for replacing during said vertical flyback period contained in said input video signal;
- wherein said means for inhibiting includes a detecting circuit for detecting said vertical flyback period and an AND gate coupled to said means for replacing for supplying said reference horizontal sync signals thereto and responsive to said detecting circuit for blocking said reference horizontal sync signals when said vertical flyback period is detected by said detecting circuit.

3. A video signal processing apparatus according to claim 1, further comprising a delay circuit, coupled to said means for inhibiting, for receiving said horizontal sync signals contained in said input video signal, delaying said received horizontal sync signals by one horizontal scanning period, and supplying said delayed horizontal sync signals to said means for inhibiting.

4. A video signal processing apparatus according to claim 2, wherein said detecting circuit includes:
- means for generating first window signals of predetermined durations, said first window signals coinciding with at least one equalizing pulse controlled in a composite sync signal included in said input video signal;
- a NAND gate for receiving said first window signals and said composite sync signal and for generating output signals in response to said equalizing pulses contained in said composite sync signal and on the basis of said first window signals;
- a waveform shaper for shaping said output signals generated by said NAND gate to provide shaped output signals;
- a counter for receiving said shaped output signals and for outputting count values; a decoder for monitoring said count values and for outputting signals for defining window periods on the basis of said count values; and
- a JK flip-flop circuit for generating second window signals on the basis of said signals output from said counter, said second window signals having durations corresponding to said window periods and being supplied as gating signals to said AND gate.

* * * * *